United States Patent [19]

Koch et al.

[11] Patent Number: 5,984,161
[45] Date of Patent: Nov. 16, 1999

[54] FLUX-ENCASED RESILIENT SOLDER PREFORMS AND PROCESS FOR THE PREPARATION THEREOF

[75] Inventors: Jürgen Koch, Mühlheim; Leander Staab, Mömbris, both of Germany

[73] Assignee: Degussa-Huls Aktiengesellschaft, Frankfurt, Germany

[21] Appl. No.: 08/987,061

[22] Filed: Dec. 8, 1997

[30] Foreign Application Priority Data

Dec. 10, 1996 [DE] Germany ............... 196 51 220

[51] Int. Cl.⁶ .................. B23K 35/14; B23K 31/02; B23K 35/34
[52] U.S. Cl. .................. 228/56.3; 228/224; 148/26
[58] Field of Search .................. 228/56.3, 224; 148/26; 75/304; 219/146.31, 85.2; 428/469, 696, 702, 450, 446

[56] References Cited

U.S. PATENT DOCUMENTS

| | | | |
|---|---|---|---|
| 3,663,245 | 5/1972 | Bryson | 106/52 |
| 3,804,666 | 4/1974 | Eppler et al. | 117/125 |
| 3,840,394 | 10/1974 | Eppler | 117/125 |
| 3,922,396 | 11/1975 | Speirs et al. | 427/250 |
| 3,925,537 | 12/1975 | Bither, Jr. | 423/277 |
| 3,939,028 | 2/1976 | Schiffarth et al. | 156/306 |
| 3,962,061 | 6/1976 | Nikaido et al. | 204/181 |
| 3,968,302 | 7/1976 | Brown | 428/328 |
| 3,977,888 | 8/1976 | Sano et al. | 106/74 |
| 4,098,610 | 7/1978 | Wexell | 106/47 R |
| 4,164,610 | 8/1979 | Beall et al. | 429/193 |
| 4,180,419 | 12/1979 | Thompson, Jr. | 148/23 |
| 4,235,649 | 11/1980 | Inamura et al. | 148/24 |
| 4,298,390 | 11/1981 | Flannery et al. | 501/32 |
| 4,415,364 | 11/1983 | Naito et al. | 106/74 |
| 4,503,158 | 3/1985 | Richard | 501/27 |
| 5,002,805 | 3/1991 | Robyn | 427/309 |
| 5,332,418 | 7/1994 | Daussan et al. | 75/303 |
| 5,378,871 | 1/1995 | Nishikawa et al. | 219/145.22 |
| 5,610,108 | 3/1997 | Watzke et al. | 501/59 |
| 5,674,108 | 10/1997 | Rolle | 451/38 |
| 5,690,271 | 11/1997 | Dudel | 228/254 |
| 5,789,068 | 8/1998 | King et al. | 428/212 |

FOREIGN PATENT DOCUMENTS

J5 7081-996  11/1980  Japan .

*Primary Examiner*—Patrick Ryan
*Assistant Examiner*—Kiley Stoner
*Attorney, Agent, or Firm*—Smith, Gambrell & Russell, LLP

[57] ABSTRACT

Relatively resilient flux encasings for solder preforms are obtained when a mixture of 5 to 30 wt. % potassium silicate having a molar ratio of $K_2O:SiO_2$ ranging from 1:2.5 to 1:4.5, 0.5 to 10 wt. % concentrated phosphoric acid, 0.1 to 5 wt. % boric acid and 0 to 10 wt. % finely divided silicon dioxide, with the remainder water, is used as the binder.

4 Claims, No Drawings

ND BACKGROUND

FLUX-ENCASED RESILIENT SOLDER PREFORMS AND PROCESS FOR THE PREPARATION THEREOF

INTRODUCTION AND BACKGROUND

The present invention relates to flux-encased solder preforms having as the flux casing a flux-binder mixture, wherein the proportion of flux is from 75 to 95% wt. % and the proportion of binder is from 5 to 25 wt. %, and to a process for the preparation of such flux-encased solder preforms.

The joining of metal work pieces, in particular in open-flame soldering, involves the use of fluxes in addition to the solder. Their function is to remove the disruptive oxide films from the base metal before the solder is melted and to protect the bright metal surfaces from further oxidation. Fluxes in the form of powders or pastes are used extensively in industry as soldering additives. The fluxes are generally applied to the work pieces as a paste or suspension, by spraying, painting or dipping, after which they are heated to melting temperature, and the base metals are materially joined to one another by the addition of solder. However, flux-coated preforms and soldering wires are also used in practice, in addition to this method of supplying the flux and solder in separate manner. Such flux-sheathed soldering wires may be used in direct manner for soldering without further additives. When the flame is first applied, the flux first melts and removes the oxide films. Further raising of the temperature results in the solder also becoming molten, bonding the members of the joint in known manner.

The preparation of flux-encased solder preforms has long been known. Typically, plastic flux-binder mixtures are applied to the solder preforms by compression, extrusion or other mechanical processes. Organic polymers, which impart a certain resilience to the flux casing after hardening and thus reduce the risk of shedding under bending stresses, are in many cases used as binders.

Thus, DE-OS 23 36 442 (German published application) describes a flux which contains methacrylate polymers as binders. The latter organic binders, however, suffer from the serious disadvantage that organic decomposition products of the binder, which arise during the soldering operation, generally reduce the efficacy of the fluxes and most commonly impair the flow of the solder. During heating, the organic auxiliary substances evaporate or burn off, resulting in undesirable sooting at the soldering site, and constituting an odor nuisance and health hazard for the operator. Moreover, when organic binders such as methacrylates (DE-OS 25 36 442) or polyisobutylenes (GB 2 027 617) are used in the preparation of the flux-sheathed solder preforms, flammable organic solvents which are injurious to health (for example methyl acetate, trichloroethylene, xylene) are frequently used. The latter solvents are emitted to the surrounding atmosphere during the subsequent drying process.

Those skilled in the art have therefore sought to use mixtures which contain no organic constitutes for such fluxes. Thus, in German patent 24 28 808 a process is described for the preparation of flux-encased solder preforms which contain alkali metal tetraborates as the flux. Such flux mixtures are heated to temperatures from 80 to 250° C., the cooled product is moistened with water, and the plastic composition is applied to the solder preforms, where it hardens. While such flux encasings have the advantage of containing no organic constituents, they also have the disadvantage of being relatively brittle and consequently highly sensitive to mechanical stresses. The result is that at the slightest bending or impact stress whole sections of the flux casing are shed, thus leaving insufficient flux available for the soldering operation.

DE OS 25 29 190 describes an organic-free flux encasing in which the addition to the flux mixture of glass fibers or metal fibers is intended to achieve greater resilience. However, sizeable quantities of glass fibers must be added to the flux to achieve good flexural strengths. The non-homogeneous melting of the flux components, however, results in an increased risk of undesirable changes in the action of the flux. Although the above document also proposes using fibers in the composition of the flux, these can barely be prepared.

Furthermore, the process when producing these flux-sheathed soldering wires is not as secure as when finely ground compressed material is used, because extrusion nozzles very easily become clogged with the longer fibers, thus disrupting the encasing operation.

DE-OS 23 36 442 also addresses the use of soluble silicates (water glass), but these are likewise brittle after hardening.

An object of the present invention is to provide flux-encased solder preforms that can avoid organic constituents that can lead to hazardous organic decomposition products.

Another object of the present invention is to avoid brittleness in flux formulations.

Yet another object of the present invention is to develop flux-encased resilient solder preforms having as the flux casing a flux-binder mixture, wherein the proportion of flux, consisting of mixtures of borates and complex fluorides, should be from 75 to 95 wt. % and the proportion of binder should be from 5 to 25 wt. %, the flux-binder mixture containing no organic substances, and the flux casing when hardened being resilient and being unaffected by mechanical deformation.

A further object of the invention is to develop a process for preparing such flux-encased solder preforms, wherein such a flux-binder mixture is applied in a plastic state to the solder preform.

SUMMARY OF THE INVENTION

The above and other objects of the invention are achieved in one aspect by a binder consisting essentially of from 35 to 90 wt. % potassium silicate having a molar ratio of $K_2O:SiO_2$ ranging from 1:2.5 to 1:4.5, from 1.5 to 30 wt. % phosphoric acid, from 0.1 to 5 wt. % boric acid and from 0 to 30 wt. % finely divided silicon dioxide.

A feature of the present invention resides in the process for preparing the flux-encased resilient solder preforms by applying a flux-binder mixture in a plastic state to the solder preforms, followed by hardening at temperature ranging from 20 to 100° C., wherein the proportion of flux should be from 75 to 95 wt. % and the proportion of binder from 5 to 25 wt. %. This is achieved by adding to the flux as the binder a mixture of from 5 to 30 wt. % potassium silicate having a molar ratio of $K_2O:SiO_2$ ranging from 1:2.5 to 1:4.5 in the form of potassium water glass, from 0.5 to 10 wt. % concentrated phosphoric acid, from 0.1 to 5 wt. % boric acid and from 0 to 10 wt. % finely divided silicon dioxide, with the remainder water. The resulting flux-binder mixture is then brought to a lumpy consistency by the addition of water in a stirring device.

DETAILED DESCRIPTION OF INVENTION

In accordance with the more detailed aspect of the invention, it has surprisingly emerged that the stability and resilience of the flux encasing can be controlled over a broad range by varying the ratio of phosphoric acid to boric acid, as a result of using an inorganic binder consisting essentially of an aqueous solution of potassium silicate in an aqueous mixture of phosphoric acid and boric acid. In contrast with the known hard, highly brittle flux casings based on a purely inorganic system, the hardness and flexibility of the flux casing of the present invention can be adapted to the relevant application by selecting the mixing ratio of phosphoric acid and boric acid in suitable manner. In so doing, the lower the boric acid content, the harder and less flexible the flux sheathings become, while an increased boric acid concentration affords a softer flux casing. The ratio of phosphoric acid to potassium silicate is selected such that the alkaline-reacting silicate solution is already largely neutralized before the boric acid is added. The desired quantity of boric acid is then dissolved in the binder mixture.

The binder preferably consists essentially of a mixture of from 3 to 6% of an 85% phosphoric acid, from 50 to 70% of a 30% potassium silicate solution and from 0.1 to 2% of solid boric acid in the water which forms the remainder. The flux preferably consists essentially of a mixture of borates and complex alkali metal fluorides and accounts for from 75 to 95% of the finished encasing composition. Any suitable flux with these general characteristics can be used for purposes of the invention.

Although many fluxes already contain boron compounds in the form of borates, the latter exert no positive influence on the resilience of the encasing. Such an effect can be achieved only with boric acid.

The process for the preparation of this novel flux encasing composition is characterized according to the invention in that the flux mixture is mixed intimately and is homogenized in a stirring device with the aqueous binder solution prepared from potassium silicate (potassium water glass), phosphoric acid and boric acid. The optimal consistency of the mixture is controlled by successive additions of fairly small quantities of water and is achieved when the mixture forms spherical lumps during stirring and no longer adheres to the wall. The outcome of mixing and homogenization can be improved by the addition of the silica component, preferably from 0.2 to 0.9% of very finely divided silica (Aerosil). After being moistened, the plastic composition is compressed and is applied to preforms such as rods or rings by known processes, for example extrusion. Stable preforms can also be prepared from these flux mixtures in the same manner.

The applied flux coverings or the preforms are hardened either within a few hours in air or in accelerated manner in drying ovens.

The Examples which follow illustrate and explain the invention in greater detail:

EXAMPLE 1

The following mixture is prepared as the encasing composition:

| | |
|---|---|
| 90.4% | finely ground hard-soldering flux (<50 μm) |
| 5.6% | potassium water glass solution, 30% ($K_2O$:$SiO_2$ = 1:4.08) |
| 0.5% | finely divided silicon dioxide (Aerosil 200) |
| 0.4% | phosphoric acid (85%) |
| 0.1% | boric acid |
| 3.0% | water |
| 100% | |

A mixture of borates and complex fluorides such as are known from the prior art is used as the hard-soldering flux.

The hard-soldering flux is placed in a mixer, the silica (Aerosil) is added, and the mixture is slowly homogenized with the aqueous solution of potassium silicate, phosphoric acid and boric acid, with stirring. When the addition is complete, stirring is continued until the encasing composition leaves the wall of the stirring unit and forms spherical balls. The composition is now in a plastic state and, after a compressed blank has been made, is applied in a conventional commercial extruder to 1.5 mm-thick hard-solder rods prepared from the alloy composition Ag55Cu21Zn22Sn2. The hardening or drying process is complete after 8 hours at room temperature. The stability of the flux-encased hard-solder rods to mechanical stress is excellent. They can be bent through an angle of up to 90° C. without shedding of the flux and are virtually unaffected by impact or shock load.

Consistent omission of organic solvents or polymers when preparing the encasing composition according to the invention means that no odor nuisance or smoking and sooting occur during soldering.

The result when soldering T-joints is a well-constructed soldered seam, because no binder decomposition products disrupt the flow of the solder.

EXAMPLE 2

The following mixture is prepared as the encasing composition:

| | | |
|---|---|---|
| 50.0% | potassium tetrafluoroborate | } as flux |
| 41.0% | potassium tetraborate | } as flux |
| 6.2% | potassium water glass (33%) $K_2O$:$SiO_2$ = 3.59 | |
| 0.7% | Aerosil COK 84 (finely divided silica) | |
| 0.5% | phosphoric acid (85%) | |
| 1.6% | water | |
| 100% | | |

As in Example 1, the flux composition is prepared in a mixer from the finely ground flux components and auxiliary substances by adding the aqueous binder, and is applied in the conventional manner to hard-solder rods or is processed into preforms. The flux casing is relatively hard and brittle owing to the omission of boric acid and therefore tolerates only minor deformation of the solder rod. Adhesion to the solder rod is, however, excellent.

The flux composition may also be formed to the desired shape in a table compressing machine or may be rolled to a 0.5–1 mm thick layer, and be dried in air. After hardening, the composition may be sliced into small flakes which are highly resistant to fracture and may be used as a flux preform for soldering with silver brazing solders in a very wide variety of soldering processes such as open-flame soldering, HF soldering or furnace brazing.

It is to be noted that any suitable solder material can be used for purposes of the present invention.

Further variations and modifications of the foregoing will be apparent to those skilled in the art and are intended to be encompassed by the claims appended hereto.

German priority application 196 51 220.4 is relied on and incorporated herein by reference.

We claim:

1. A flux-encased resilient solder preform having as the flux casing a flux-binder mixture, comprising as the flux, from 75 to 95 wt. % of a mixture consisting essentially of at least one borate and at least one complex fluoride, and a binder in the amount of 5 to 25 wt. %, wherein the binder consists essentially of from 35 to 90 wt. % potassium silicate having a molar ratio of $K_2O:SiO_2$ ranging from 1:2.5 to 1:4.5, from 1.5 to 30 wt. % phosphoric acid, from 0.1 to 5 wt. % boric acid and from 0 to 30 wt. % finely divided silicon dioxide.

2. The flux-encased resilient solder preform according to claim 1 in the shape of a soldering wire encased with the said flux.

3. The flux-encased resilient solder preform according to claim 1, wherein said binder consists essentially of a mixture of 3 to 6% of an 85% phosphoric acid, from 50 to 70% of a 30% potassium silicate and from 0.1 to 2% of solid boric acid, the balance being water.

4. A fracture resistant flux preform consisting essentially of a flux-binder mixture, wherein the proportion of flux, consisting essentially of a mixture of at least one borate and at least one complex fluoride, is from 75 to 95 wt. % and the proportion of binder is from 5 to 25 wt. %, wherein the binder consists essentially of 35 to 90 wt. % potassium silicate having a molar ratio of $K_2O:SiO_2$ ranging from 1:2.5 to 1:4.5, 1.5 to 30 wt. % phosphoric acid, 0.1 to 5 wt. % boric acid and 0 to 30 wt. % finely divided silicon dioxide.

* * * * *